United States Patent [19]
Braddon

[11] 3,715,571
[45] Feb. 6, 1973

[54] SHIP'S TURN RATE CONTROL SYSTEM

[75] Inventor: Frederick D. Braddon, Babylon, N.Y.

[73] Assignee: Sperry Rand Corporation

[22] Filed: June 7, 1971

[21] Appl. No.: 150,495

[52] U.S. Cl. ............ 235/150.2, 114/144 R, 318/586
[51] Int. Cl. ............................................. G06g 7/78
[58] Field of Search ........ 114/144 R; 244/77 E, 77 S; 235/150.2; 340/30; 318/580, 585–586, 588, 619, 624, 489; 330/86

[56] References Cited

UNITED STATES PATENTS

| 3,133,520 | 5/1964 | Bentkowsky et al. .............. 114/144 R |
| 3,237,107 | 2/1966 | Bresenoff et al. .................... 330/86 X |
| 3,111,105 | 11/1963 | Bentkowsky et al. .............. 114/144 R |
| 3,140,436 | 7/1964 | Hatch ........................... 114/144 R X |
| 2,766,952 | 10/1956 | Alderson ....................... 235/150.2 X |
| 3,604,907 | 9/1971 | Wesner ............................. 235/150.2 |
| 3,428,788 | 2/1969 | Fisher et al. ........................ 235/150.2 |
| 3,545,398 | 12/1970 | Fisher et al. ........................ 114/144 R |
| 3,488,427 | 1/1970 | Anthony ..................... 235/150.2 UX |

*Primary Examiner*—Eugene G. Botz
*Assistant Examiner*—Jerry Smith
*Attorney*—S. C. Yeaton

[57] ABSTRACT

A conventional ship's steering system is modified to limit the degree of heeling during turns by limiting the centrifugal force developed during such turns. The present invention utilizes the fact that centrifugal force is proportional to the product of a ship's speed and turning rate. The ship's speed and rate-of-turn are measured and multiplied in a computer. Rudder command signals are applied to the steering mechanism through a summing amplifier. The output of the computer is used to modify the characteristics of the amplifier to a value that maintains the computer output within the acceptable limits. Thus heel control is achieved by automatically regulating the rudder positioning control.

3 Claims, 1 Drawing Figure

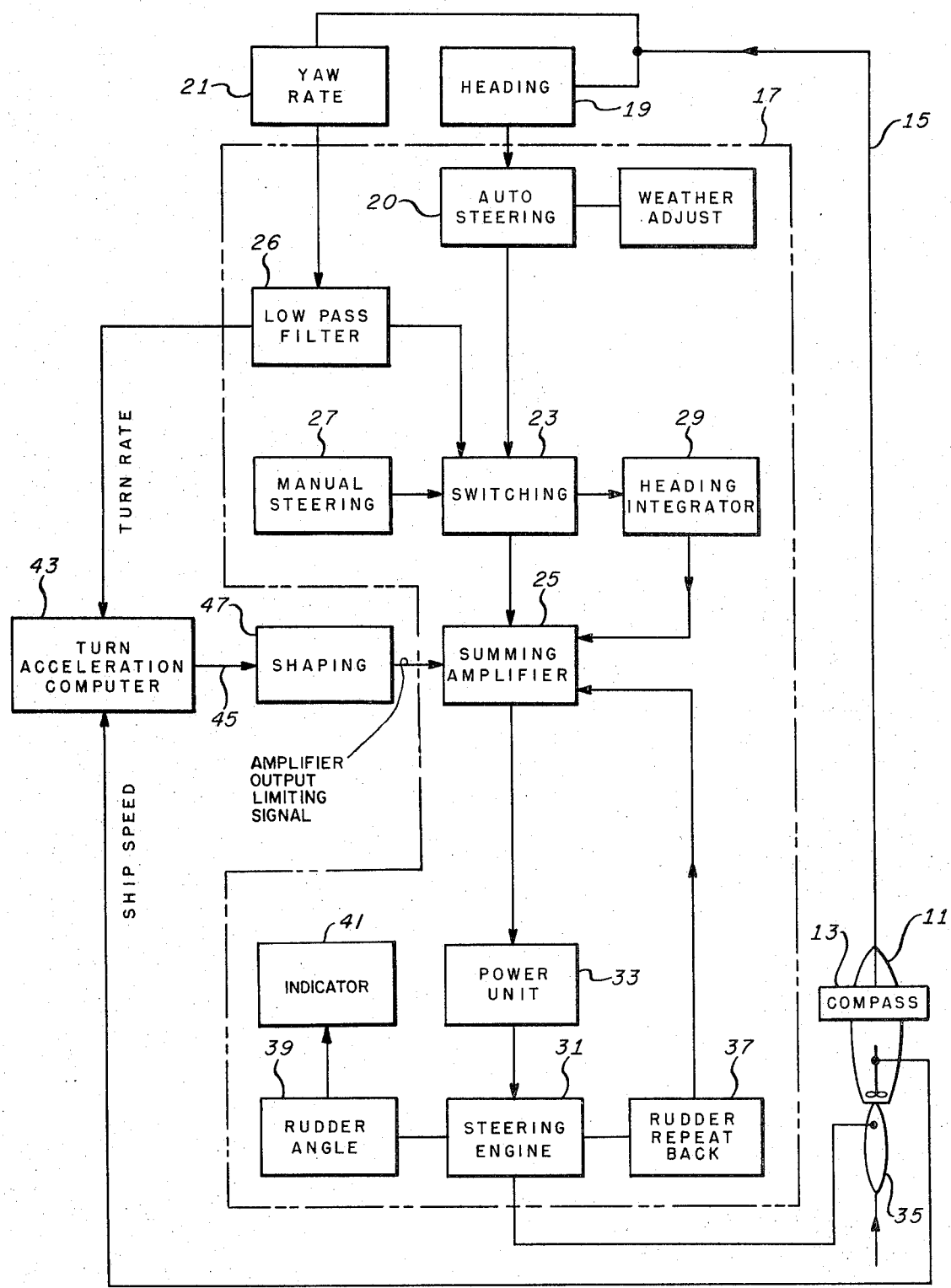

SHIP'S TURN RATE CONTROL SYSTEM

BACKGROUND OF THE INVENTION

1. Field of the Invention

This invention relates to ship steering systems and more specifically to ship steering systems in which the turn rate of the ship is controlled in accordance with the ship's speed.

2. Description of the Prior Art

Two trends in the design of modern container vessels cause concern for the controllability and safety of these vessels when operating at designed speeds in the open sea: The load density of container type cargo requires a high loading of deck cargo with a resulting high center of gravity and a large exposure to wind forces. The upward trend in ship speeds greatly increases the dynamic forces acting on the vessel thereby affecting the stability and maneuverability of these vessels.

Recent research studies supported by actual tests to demonstrate the behavior of ships when operating in oblique seas provide a basis for predicting the behavior of these vessels. These studies reveal the critical heeling-broaching tendencies which develop when the ship lengths approach the crest-to-crest span of large waves and when the ship speeds approach the velocities of large following waves.

Still other tests have demonstrated the severe heeling tendency of container type vessels when turning at high speeds in clam water. This situation stems from the high centrifugal force acting at the high center of gravity and resisted by a very small stability moment.

If the aforementioned dynamic conditions of heeling and broaching should develop in combination due to the inadvertent command for a full rudder maneuver at high speed, both the deck cargo and the vessel itself could be jeopardized. Proposals have been made to measure the centrifugal acceleration by means of a transverse accelerometer arranged to sense the turn acceleration. Such an accelerometer, however, is reduced in effectiveness by the slow buildup of turn acceleration after a ship starts swinging and also by the disturbing roll motion causing excessive rudder activity. If such accelerometers are highly damped, then further delay in response is incurred.

Systems for limiting the turn rate of vessels under such conditions have been developed in which the maximum rudder angles that can be tolerated are set manually. Such systems, however, restrict the controllability of the vessel by limiting the capacity of the rudder for counteracting cyclic disturbances of short duration as experienced in heavy following seas.

SUMMARY OF THE INVENTION

The present invention limits a ship's turn acceleration to a safe value by sensing the rate of turn and the speed of the ship, obtaining the mathematical product of these quantities, and controlling the average rudder angle in accordance with this product.

BRIEF DESCRIPTION OF THE DRAWING

The sole FIGURE is a block diagram illustrating the circuit of the invention operating in its intended environment.

DESCRIPTION OF THE PREFERRED EMBODIMENT

The present invention utilizes the classical relationship between centrifugal force and the velocity and turning radius of a solid body: $F = mv^2/r$. The circumferential velocity $v$, however, equals $2\pi rw$ where $w$ is the angular rate of turn. Thus the centrifugal force is proportional to $vw$.

The centrifugal force acting on a ship causes heeling during a turning maneuver. A vessel tends to "skid" when entering a turn. Thus although the fore-aft axis of the vessel rotates in the desired direction during the initial stages of a turn, the momentum of the vessel tends to maintain a straight-line course during this time. However, the heading of the vessel, as indicated by the compass, rotates with the fore-aft axis, providing significant rate-of-turn signals even before the actual buildup of centrifugal forces occurs. The system of the present invention thus actually anticipates dangerous levels of heel. The present invention makes use of the aforementioned $vw$ relationship as described in the following text and the accompanying figure.

A ship 11 containing a compass 13 capable of providing an electrical signal representing the ship's heading on a transmission line 15 employs a conventional steering system 17. The ship's heading signal is applied to a conventional heading transmitter 19 and a yaw rate transmitter 21. The heading transmitter provides an electrical signal indicative of the direction of travel of the ship whereas the yaw rate transmitter provides an electrical signal indicative of the rate at which the vessel is turning. The output of the heading transmitter may be applied to an automatic steering device 20 which constantly compares the output of the heading transmitter to a signal representing the desired course. Typically, a weather adjustment is provided to adjust the sensitivity of the automatic system to compensate for sea conditions. The output of the automatic steering mechanism is applied through a switching mechanism 23 to a summing amplifier 25. A signal from the yaw rate transmitter 21 is filtered in a low pass filter 26 and also applied to the switching mechanism. The filter 26 rejects short term variations in heading caused by wave action and the like. If desired, the ship may be guided manually by switching the mechanism 23 to receive electrical signals from the manual system 27. Typically, the steering signal is also integrated in a heading integrator 29 and applied to the summing amplifier 25. The integrated signal compensates for "bias" forces such as those set up by variations in propeller speeds occurring in twin screw vessels, oblique seas, and similar sustained forces.

The output of the summing amplifier is applied to a steering engine 31 through a suitable power unit 33. The steering engine actuates the rudder 35 of the vessel.

The rudder repeat back unit 37 senses the rudder position and reduces the error signal to zero so as to balance the command signal when the rudder angle reaches a desired value.

A rudder angle transmitter 39 provides a signal for the indicator 41 to appraise the helmsman of the angle at which the rudder is set.

The control system 17 is modified according to the principles of the present invention by extracting a turn rate signal from the filter 26 and applying this to a turn acceleration computer 43. A second signal, representing the ship's speed, is also applied to the turn acceleration computer 43. The ship's speed may conveniently be measured by applying a conventional tachometer to the propeller shaft.

The computer 43 serves to multiply the value of the turn rate signal by the value of the ship speed signal so as to produce an output signal ($vw$) on a line 45. This represents a limiting signal to be applied to the summing amplifier 25 after suitable modification in a shaping circuit 47. The shaping circuit converts the signal from the computer into a signal that can be utilized by the amplifier 25 and may, for instance, include an adjustable gain amplifier or potentiometer. The shaped limiting signal alters the transfer characteristics of the summing amplifier so as to progressively restrict the output of the summing amplifier as the vw product increases. The setting of the amplifier or potentiometer in the shaping circuit may be adjusted to calibrate the system.

In general, the limiting signal serves to restrict the magnitude of the command signal as an inverse function of the limiting signal. Thus the shaped limiting signal may be used to control the gain of the summing amplifier. Straightforward gain control circuits, for example, may be used to perform this function by utilizing the limiting signal rather than a feedback signal for gain control.

In some applications, it may be preferable to restrict the command signals to magnitudes within sharply defined threshold limits set in accordance with the limiting signal. A variety of controlled clipping circuits which may be used for this purpose are known in the art. Typically, such clipping circuits employ shunt diode circuits which can be biased by the limiting signal so as to bypass any portion of the input signal that exceeds the magnitude of the limiting signal. Circuits of this type can be used with the present invention, for instance, by merely inverting the limiting signal in the shaping circuit so as to set the threshold as an inverse function of the vw product as represented by the limiting signal.

In either type of circuit, an inadvertent command for a "hard over" rudder can produce only a rudder deflection which remains within a safe value. If the circuit is of the type in which the limiting signal reduces the gain of the amplifier, the reduction in gain will be sufficient to restrict rudder deflection. If a circuit is of the type that provides a specific threshold, the rudder will be deflected at an angle commensurate with the threshold and the excess command signal will be unable to deflect the rudder beyond the limit established by the threshold.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A ship's turn rate limiting system for use with marine craft of a type in which the steering apparatus produces an electrical command signal that controls rudder angle through an electrical network, said limiting system including means to produce a first electrical signal indicative of the ship's speed, means to produce a second electrical signal indicative of the ship's turning rate, means to produce an electrical limiting signal proportional to the mathematical product of said first and second electrical signals and means to restrict the magnitude of said command signal as an inverse function of said limiting signal.

2. The system of claim 1 wherein the means to restrict the magnitude of the command signal includes a variable gain amplifier connected to provide the command signal, said amplifier being further connected and arranged so that its gain is decreased by an increase in said limiting signal.

3. A ship's steering system for use on marine craft guided by a rudder and having a compass system capable of providing an electrical signal indicative of the ship's heading, said steering system including means to produce a command signal, means to regulate the deflection angle of said rudder in accordance with the value of said command signal, means to produce a signal indicative of the rate-of-change of the ship's heading signal, means to produce a signal indicative of the speed of said ship, means to produce a limiting signal indicative of the mathematical product of said rate-of-change signal and said speed signal, and means for progressively restricting the value of said command signal with increasing values of said limiting signal.

* * * * *